(12) United States Patent
Shoham et al.

(10) Patent No.: US 8,322,535 B2
(45) Date of Patent: Dec. 4, 2012

(54) POMEGRANATE SEED SEPARATOR (75) Inventors: Menachem Shoham, Ramat HaGolan (IL); Noa Ohad, Ramat HaGolan (IL)

(73) Assignee: Miriam Shoham, Ltd., Moshav Ramot—Ramat HaGolan (IL)

( * ) Notice: Subject to any disclaimer, the term of this patent is extended or adjusted under 35 U.S.C. 154(b) by 60 days.

(21) Appl. No.: 12/909,906

(22) Filed: Oct. 22, 2010

(65) Prior Publication Data
US 2011/0094947 A1 Apr. 28, 2011

Related U.S. Application Data (60) Provisional application No. 61/253,897, filed on Oct. 22, 2009.

(51) Int. Cl.
*B07B 1/00* (2006.01)
*A47J 43/00* (2006.01)

(52) U.S. Cl. ............. 209/235; 209/262; 99/556; 99/571

(58) Field of Classification Search .................. 209/235, 209/259, 262, 370, 379, 381, 382; 99/515, 99/555, 556, 571
See application file for complete search history.

(56) References Cited

U.S. PATENT DOCUMENTS

| | | | | |
|---|---|---|---|---|
| 6,366 A * | 4/1849 | Johnston | ...................... | 209/302 |
| 329,026 A * | 10/1885 | De La Vergne, Jr. | ......... | 222/111 |
| 453,235 A * | 6/1891 | Crary | ............................. | 209/349 |
| 543,780 A * | 7/1895 | Pott | ................................ | 209/397 |
| 706,129 A * | 8/1902 | Taylor | ........................... | 209/405 |
| 886,075 A * | 4/1908 | Remington | .............. | 15/104.001 |
| 3,713,454 A * | 1/1973 | Tsukisaka | ..................... | 132/212 |
| 4,530,278 A * | 7/1985 | Sarig et al. | ...................... | 99/547 |
| 4,927,991 A * | 5/1990 | Wendt et al. | .................. | 219/728 |
| 5,064,671 A * | 11/1991 | Kock et al. | ..................... | 426/481 |
| 6,382,089 B1 * | 5/2002 | Thiffault | .......................... | 99/506 |
| 7,284,393 B1 * | 10/2007 | Macmillan | ................... | 62/457.7 |
| 7,303,079 B2 * | 12/2007 | Reid-Robertson et al. | ... | 209/405 |
| 8,123,045 B2 * | 2/2012 | White et al. | .................. | 209/680 |
| 2008/0060529 A1 * | 3/2008 | Umali | ............................. | 99/341 |
| 2011/0139018 A1 * | 6/2011 | Schmilovitch et al. | ......... | 99/552 |

* cited by examiner

*Primary Examiner* — Joseph C Rodriguez
(74) *Attorney, Agent, or Firm* — Robert G. Lev; Michael Factor (57) ABSTRACT An apparatus for separating the arils from a fruit such as a pomegranate. The apparatus comprising a perforated grid for fixing over a receptacle, and a dome for covering the fruit and a corresponding method for removing seeds from a fruit comprising:

(a) opening the fruit into at least two pieces;

(b) placing the opened fruit opening side down onto a perforated grid and placing a dome over the piece of fruit;

(c) placing the grid over a receptacle;

(d) tapping the dome to separate and dislodge the arils from the fruit so that they fall through the openings into the receptacle.

3 Claims, 9 Drawing Sheets

POMEGRANATE SEED SEPARATOR

PRIORITY INFORMATION

The present invention claims priority to U.S. Provisional Application No. 61/253,987 filed on Oct. 22, 2009, making reference herein to same in its entirety.

FIELD OF THE INVENTION

The present invention is directed to a device and method for removing seeds from fruit and vegetables, and in particular, the arils from pomegranates.

BACKGROUND OF THE INVENTION

The pomegranate fruit is the fruit of a deciduous tree that is native to Israel, the Iranian Plateau and India. Introduced into Latin America and California by Spanish settlers in 1769, pomegranate is now cultivated in parts of California and Arizona for juice production.

The fruit consists of a rind containing seed casings or arils separated by a bitter pith membrane. The aril contains the fleshy part of the fruit that is eaten and the woody seed part that may be eaten but is often spat out.

Pomegranate aril juice provides about 16% of an adult's daily vitamin C requirement per 100 ml serving, and is a good source of vitamin $B_5$ (pantothenic acid), potassium and polyphenols, such as tannins and flavonoids. Pomegranates also have high-fiber due to the edible seeds which also supply unsaturated oils.

The most abundant polyphenols in pomegranate juice are the hydrolyzable tannins called ellagitannins formed when ellagic acid binds with a carbohydrate. Punicalagins are unique pomegranate tannins with free-radical scavenging that are absorbed into the human body and may have dietary value as antioxidants. Other phytochemicals include polyphenolic catechins, gallocatechins, and anthocyanins, such as prodelphinidins, delphinidin, cyanidin, and pelargonidin.

Pomegranate juice and seeds are widely used in dietary supplements and may reduce cardiovascular disease. Consumption of pomegranate juice has been shown to reduce systolic blood pressure by inhibiting serum angiotensin-converting enzyme. Juice consumption may also inhibit viral infections while pomegranate extracts have antibacterial effects against dental plaque. Preliminary in vitro research indicates that extracts of the fruit may inhibit the proliferation of human breast cancer cells.

Since pomegranate juice is easily released by the ripe aril, and stains clothes and hands, the problem of removing the arils from the rind is widely attributed as a main cause of pomegranates having low market penetration despite their antioxidant properties and other health benefits. It would, therefore, be useful to facilitate the extraction of pomegranate arils from the fruit without using the hands. The present invention is directed to means for so doing.

SUMMARY OF THE INVENTION

In a first aspect, the present invention is directed to providing an apparatus for separating seeds from a fruit, the apparatus comprising a grid with openings for placing over a receptacle, and a dome for covering a piece of the fruit.

Typically, the fruit is selected from the group comprising pomegranate, akee, mangostein and jackfruit.

Most typically, the fruit comprises pomegranate.

In preferred embodiments, the apparatus further comprises the receptacle.

In most preferred embodiments, the apparatus further comprises an airtight lid for sealing the receptacle on removal of the grid with openings and the dome.

Preferably the receptacle is a serving bowl.

Optionally the serving bowl is decorated with at least one pomegranate motif.

In preferred embodiments, the apparatus further comprises a clapper for hitting the dome.

Optionally, the clapper is a serving spoon that can also be used for dispensing pomegranate seeds from the receptacle. Alternatively it is a mallet.

Optionally the openings are less than 30 mm across.

Typically, the grid includes openings that are between 3 mm and 10 mm across.

Optionally, the grid comprises a plurality of elliptical openings.

In one embodiment, the grid comprises a plurality of hexagonal openings that are each between 3 mm and 10 mm across.

In one embodiment, the grid comprises a plurality of quadrilateral openings.

In one embodiment, the grid comprises a plurality of triangular openings.

In one embodiment, the grid comprises a plurality of square based pentagonal openings.

In another embodiment the grid comprises a series of parallel wires separated by gaps thereby providing elongated openings.

In a second aspect, the present invention is directed to a method of removing seeds from a fruit comprising:
(a) cutting the fruit into at least two pieces;
(b) placing at least one cut piece of the fruit cut surface downwards onto a grid and placing a dome over the piece of fruit;
(c) placing the grid over a receptacle;
(d) tapping the dome to separate and dislodge the seeds from the fruit so that they fall through openings through the grid into the receptacle.

Typically, the fruit is selected from the group comprising pomegranate, akee, mangostein and jackfruit.

Most typically, the fruit comprises pomegranate.

Typically, the fruit is substantially cut in half.

In preferred embodiments the tapping is performed with a spoon that may also be used as a serving implement for serving from the receptacle.

BRIEF DESCRIPTION OF THE DRAWINGS

The invention may be understood upon reading of the following detailed description of non-limiting exemplary embodiments thereof, with reference to the following drawings, in which.

The Figures, shown in Drawing Sheets 1-9, are generally schematic perspective views of exemplary embodiments of an apparatus for separating seeds from a fruit, in particular from a pomegranate, in accordance with the present invention. Specifically.

DETAILED DESCRIPTION OF EMBODIMENTS OF THE INVENTION

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

Figure 1:
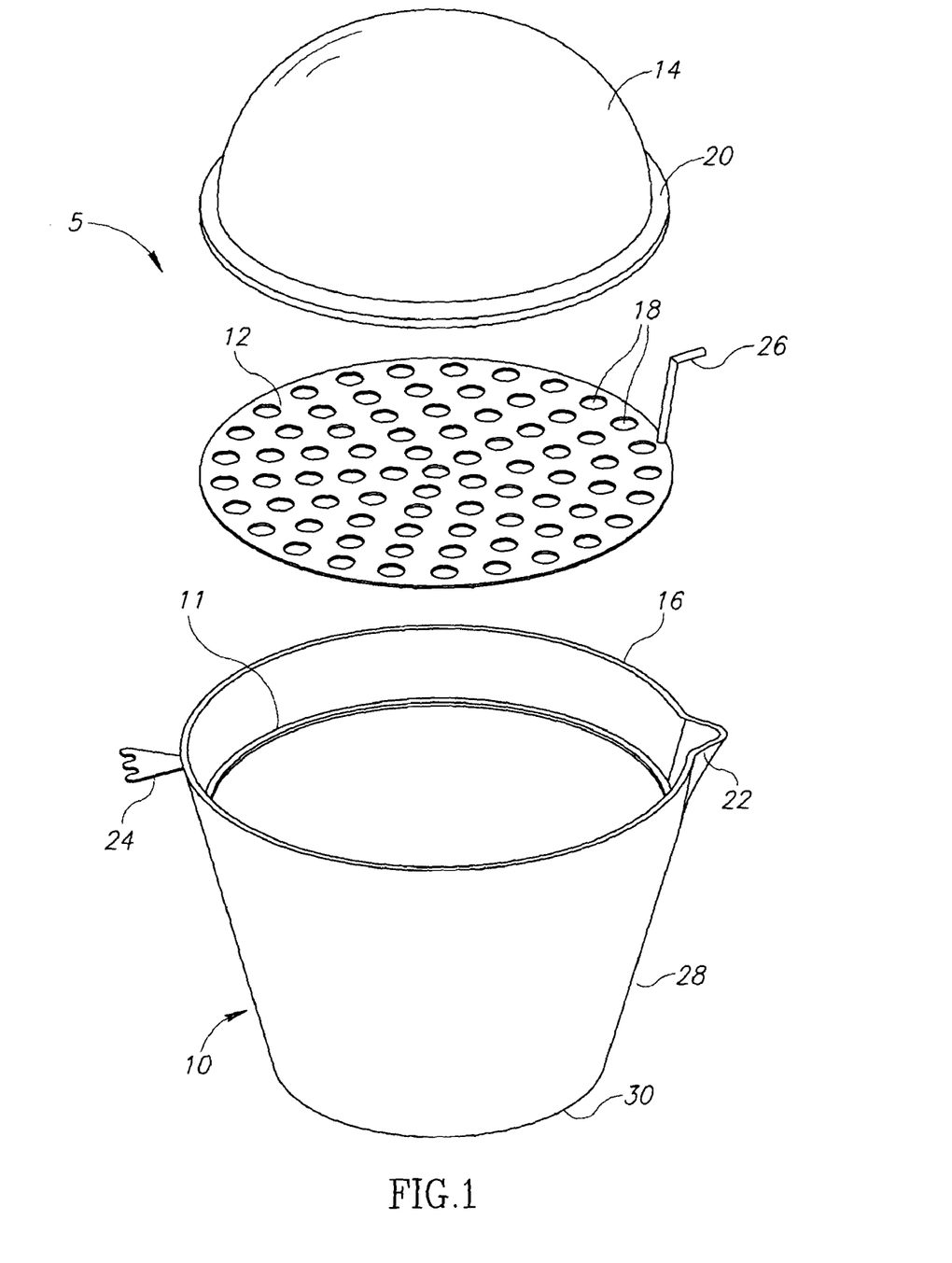
FIG. 1 is a partially exploded schematic view, shows components of an exemplary embodiment of an apparatus for separating seeds from a pomegranate.

With reference to FIG. 1, a partially exploded schematic view of the components of an exemplary embodiment of an apparatus 5 for separating seeds from a fruit, typically a pomegranate, is shown. The apparatus 5 comprises a grid 12 with openings 18 therethrough, and a generally hemi-spherical dome 14.

The grid 12 and dome 14 may be placed over a receptacle 10 that serves as an aril collecting device, and is typically a bowl. Although not necessary part of the apparatus as vended, since any receptacle of appropriate size may be used, in preferred embodiments the apparatus as sold includes the receptacle 10. Usefully, the receptacle 10 is a serving bowl that can be placed on the table. It may be decorated with pomegranate motifs or have a handle shaped as a pomegranate crown—as shown.

Receptacle 10 and grid 12 are designed to interface wherein the grid 12 rests on the rim 16 of the receptacle 10, or more typically slightly below and within the receptacle 10, perhaps on a ledge 11.

Typically the grid 12 includes openings of from 3 mm to 10 mm across, allowing the arils of the pomegranate to pass therethrough, but preventing the bitter membrane from passing. The openings may, however, be larger and usefully at least one opening is 30 mm across, thereby also allowing insertion of a finger to raise the grid.

The openings or openings are discussed in more detail with reference to FIGS. 6(a-f) below.

The bowl 10 and grid 12 can be made from any of a variety or combination of suitable materials, for example, plastic, wood, metal, ceramic and so forth. Most typically, the grid will be fabricated from plastic or from metal wires. The receptacle, typically a bowl, may be ceramic or glass and thus suitable for putting on the table. Where used for ritual purposes, such as for the Jewish New Year, the bowl 10 may be fabricated from silver.

Dome 14 is typically made of resilient material such as an elastomeric material, for example rubber or silicone. Dome 14 is dimensioned so that it generally adjoins (touches) the pomegranate piece H or is slightly larger than the pomegranate so there is a slight space between the dome and the pomegranate piece. In one embodiment, the apparatus comprises a series of domes for different sized pomegranate pieces, i.e. approximately halves of different sized pomegranates and other fruit. According to some embodiments, dome 14 has an annular lip 20 to help it sit stably on grid 12. In some embodiments, the lip 20 of the dome can be rolled upwards so that the dome can be pushed down until it contacts the pomegranate half, and then held in position, and in some embodiments, bowl 10 includes a spout 22 and a handle 24; and grid 12 includes a handle 26.

Figure 2:
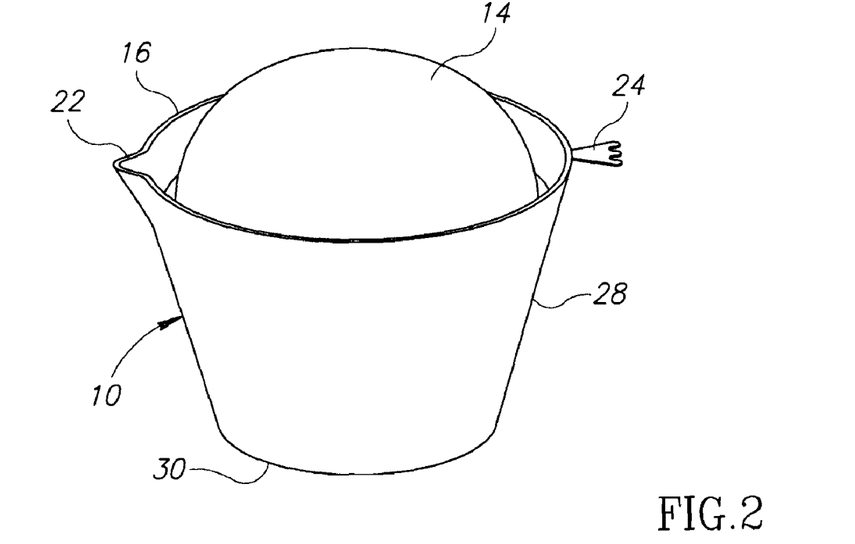
FIG. 2 shows the apparatus with the dome resting on the grid (not shown) within the bowl.

As shown in FIGS. 1 and 2, the grid 12 may rest inside the receptacle 10 slightly below the rim 16, perhaps on a ledge therein. In this exemplary embodiment, bowl 10 has downwardly tapered walls 28, giving the bowl a frusto-conical shape, wherein the rim 16 has a wider opening than the footprint of the bowl's base 30. The grid 12 has a planar area that is slightly smaller than that defined by rim 16 so that the grid rests within bowl 10, slightly below the bowl's rim, as mentioned.

Where a special receptacle is not provided, the grid should cover the receptacle and extend outwards. If slightly concave, this will help the grid stay in place during the tapping.

It should be noted that receptacle 10 and grid 12 as illustrated typically have rounded profiles, but are not limited to such. A square grid can be made for used with a square bowl, for example. Furthermore, it will be appreciated that a large grid of many forms and shapes can adequately cover a narrower mouthed receptacle.

Figure 3:
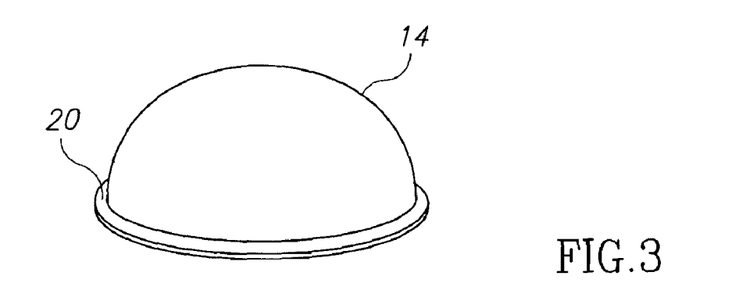
FIG. 3 and FIG. 4 show additional views of the dome and bowl, respectively.
Figure 4:
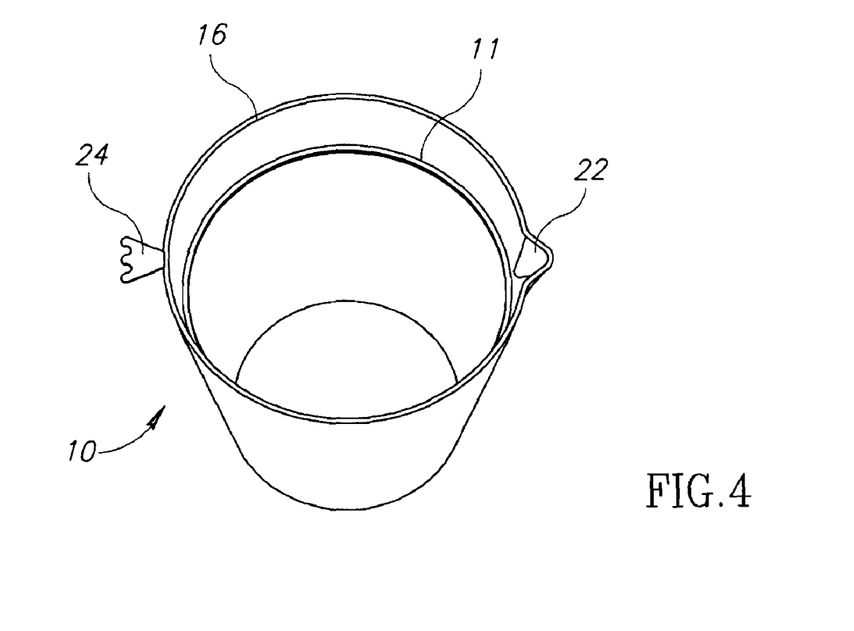

FIG. 2 shows the apparatus with dome 14 resting on grid 12 (not visible) within bowl 10. FIG. 3 and FIG. 4 show additional views of the dome 14 and bowl 10 respectively.

Figure 5A:
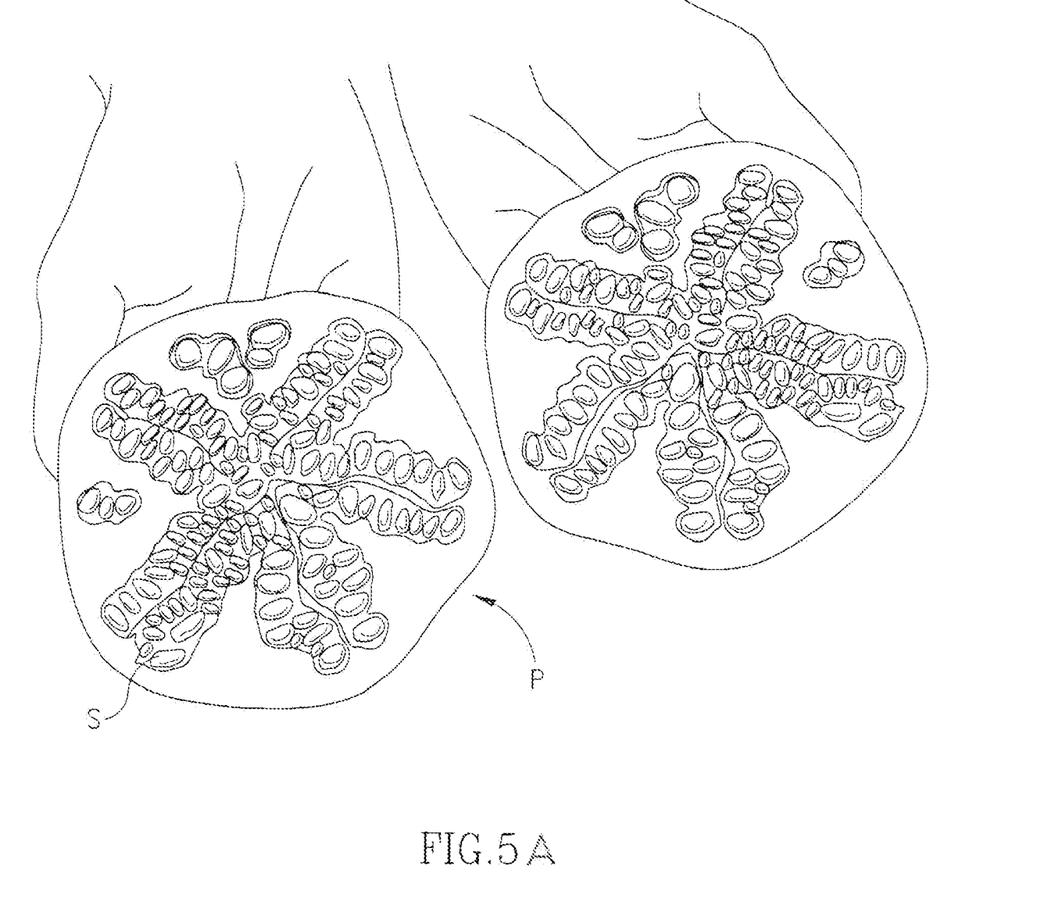
FIGS. 5A-5E illustrate how the apparatus of the invention may be used to remove seeds from a pomegranate.
Figure 5B:
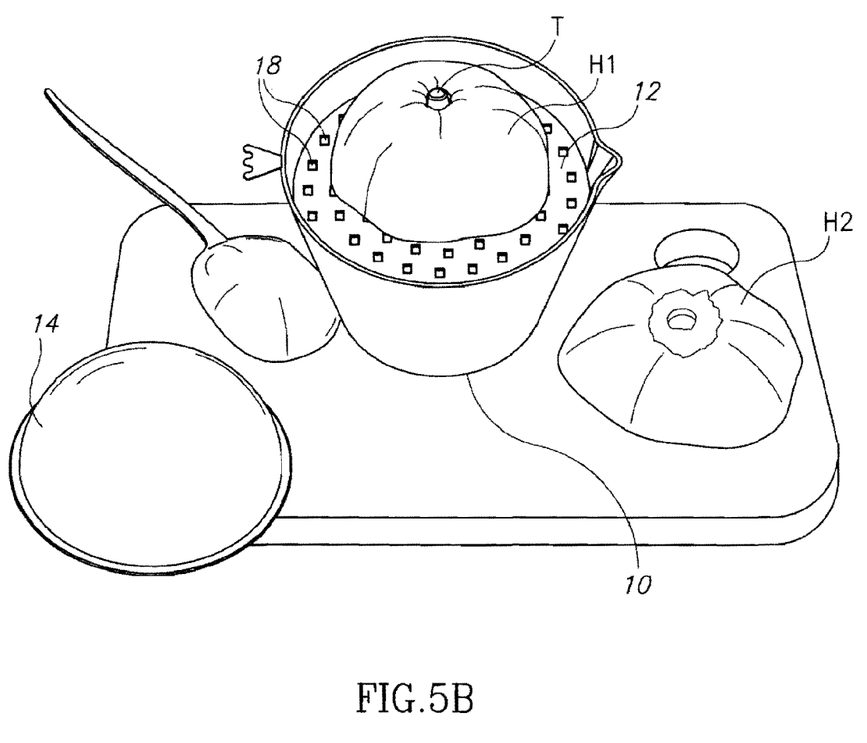
Figure 5C:
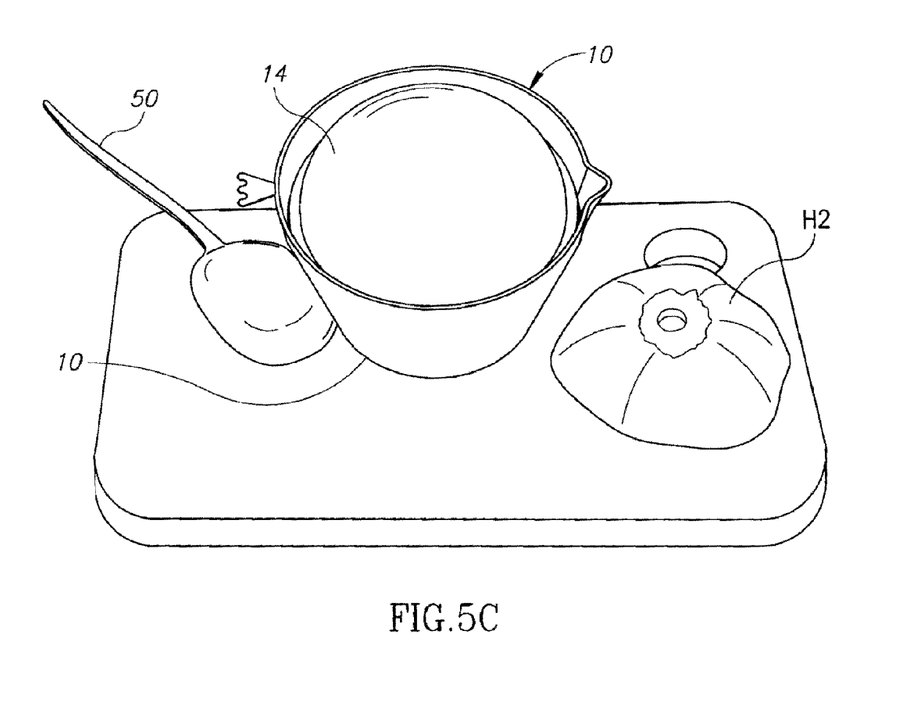
Figure 5D:
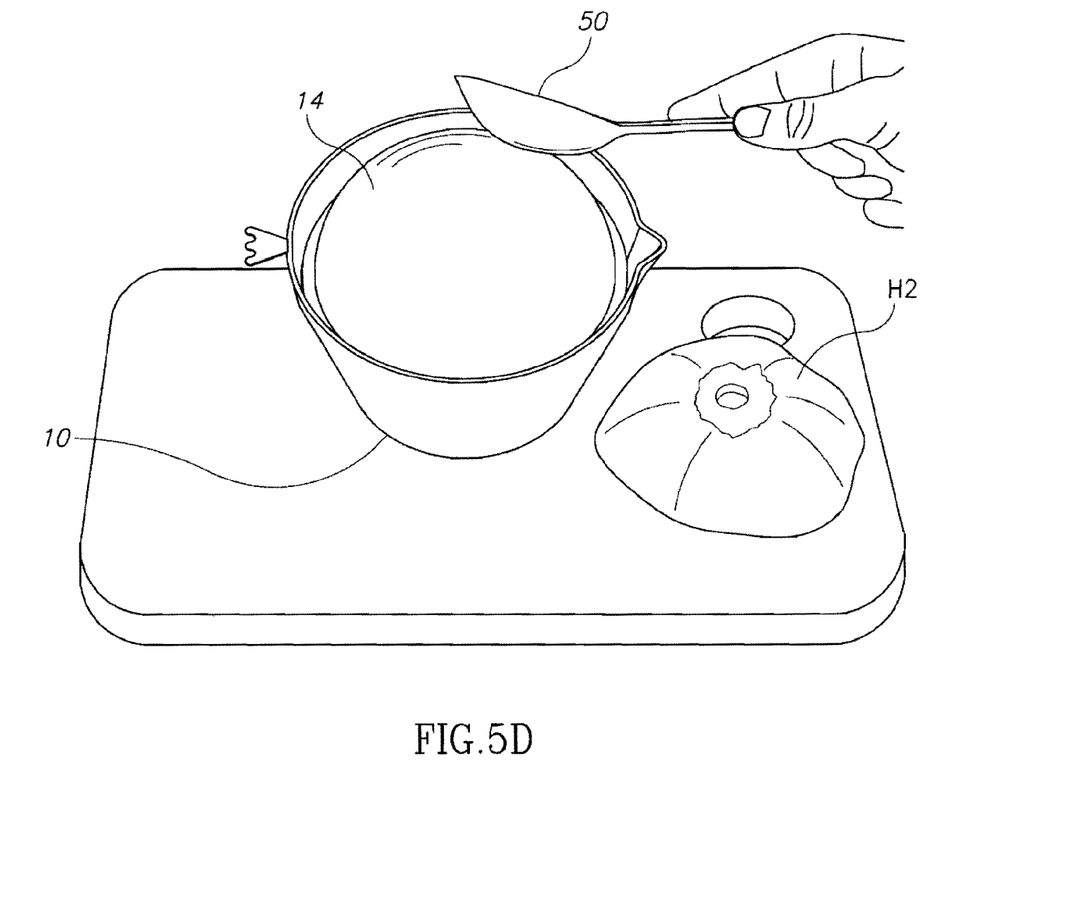
Figure 5E:
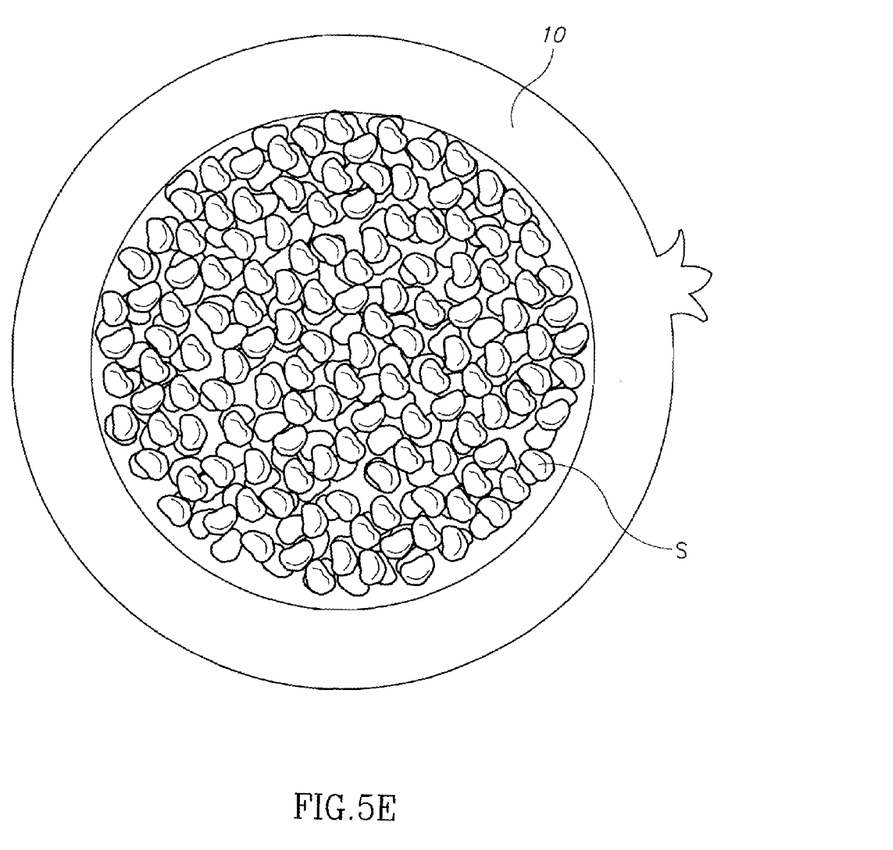
Figure 6A:
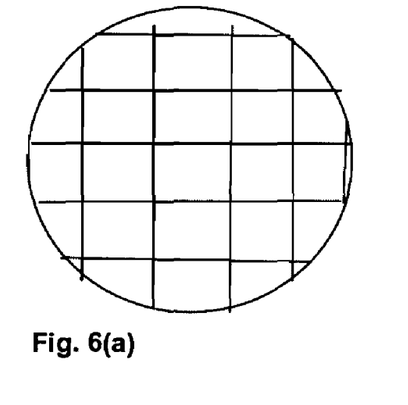
FIGS. 6(a) to 6(f) show different opening arrangements for the grid.
Figure 6B:
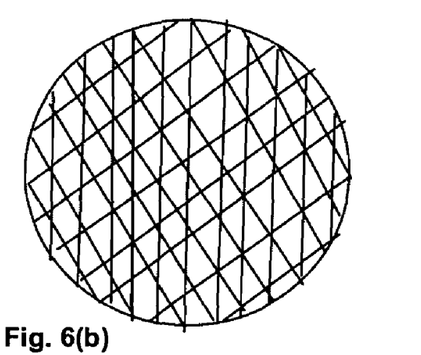
Figure 6C:
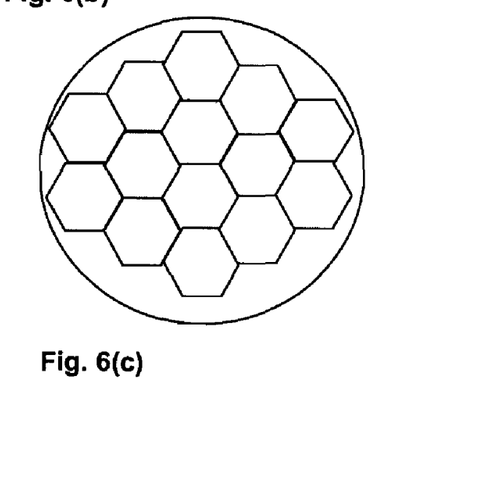
Figure 6D:
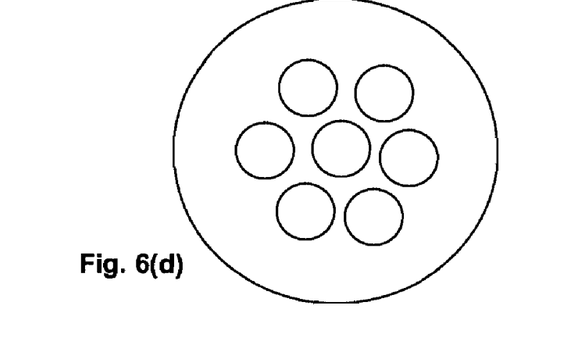
Figure 6E:
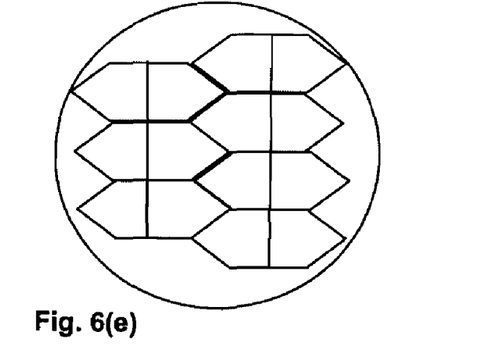
Figure 6F:
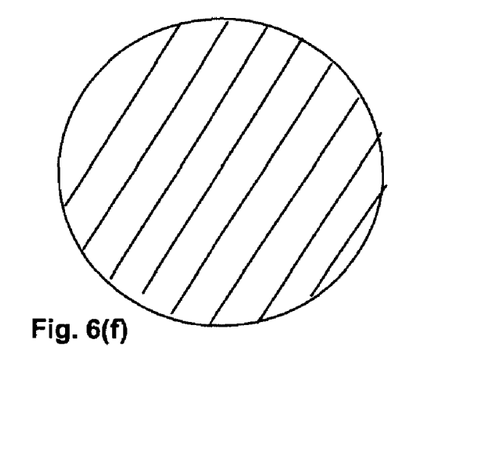

FIGS. 5A-5E illustrate use of the present apparatus to remove seeds from the pomegranate P, i.e. a method of removing seeds S from the pomegranate. The pomegranate has a side or half H1 with a stem T (seen in FIG. 5B) and a side or half H2 with a crown. Preferably the crown is first removed from the pomegranate P (half H2 seen after removal of the crown in FIG. 5B), e.g. by cutting it off and the pomegranate is cut approximately in half (FIG. 5A). Without limitation, typically, or even preferably, the pomegranate P is cut into top and bottom halves, the top being the portion from which the crown was cut. Grid 12 is placed in bowl 10 as exemplified in FIG. 1; and one half of the pomegranate P is placed on the grid (FIG. 5B). Dome 14 is then placed on the pomegranate half (FIG. 5C) and the dome is tapped a few times (FIG. 5D), preferably at a variety of locations generally at the top of the dome, using a blunt instrument or clapper, that may be a spoon, such as a large kitchen spoon or the like. This causes the pomegranate seeds to be easily removed from the pomegranate half and then the seeds fall through the openings 18 of the grid 12 into the bowl 10, without a mess, as shown in FIG. 5E.

In some embodiments a dedicated receptacle and clapper are provided with the grid and dome. The clapper may be a serving spoon for spooning out pomegranate seeds from the receptacle which may be a serving bow 10.

It will be appreciated that the present invention protects the arils of the pomegranate from human touch. The arils are less likely to become squashed or otherwise damaged and the person separating the arils from the internal membrane and external rind is less likely to become stained with pomegranate juice.

Many other embodiments or modifications of the apparatus are possible, within the scope of the invention. For example, according to some embodiments the bowl 10 a cylindrically shaped lower wall portion and an outwardly tapered upper portion—or a slightly tapered lower wall portion and an outwardly tapered upper portion being greater than that of the lower portion; the bowl has a cylindrical wall; the bowl has an inwardly projecting shoulder to support the grid 12. As a further example of a modification of the apparatus, the bowl 10 has a square profile or any other suitable shape.

In other embodiments, where the grid 12 is designed to sit or rest on top of the bowl 10, the apparatus preferably comprises a mechanism to help secure the grid to rim 16 of bowl 10—or a mechanism to at least mitigate excessive movement of the grid on the bowl's rim, for example a downwardly projecting lip, which may or may not be continuous; i.e. may be constituted by a one or more projections.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

With reference to FIGS. 6(a) to (e), optionally, the perforated grid comprises a grid of openings that are each between 3 mm and 10 mm across and may be as much as 30 mm across. These may be widely separated but are typically closely packed. The openings may be elliptical or round, or polygonal. For example, the grid may consist of a grid of quadrilateral openings 6(a) that may be square, rectangular, trapezoidal, rhombus, or irregular; triangular openings 6(b), hexagonal openings 6(c), elliptical or circular openings 6(d), square based pentagonal openings 6(e). Other non tessellating shapes are also possible. Indeed the grid could consist of a set of parallel unidirectional wires as well (f) with the 'openings' being elongated spaces crossing the full width of the grid. Typically, however, the each opening is however, not more than about 30 mm across.

Figure 7:
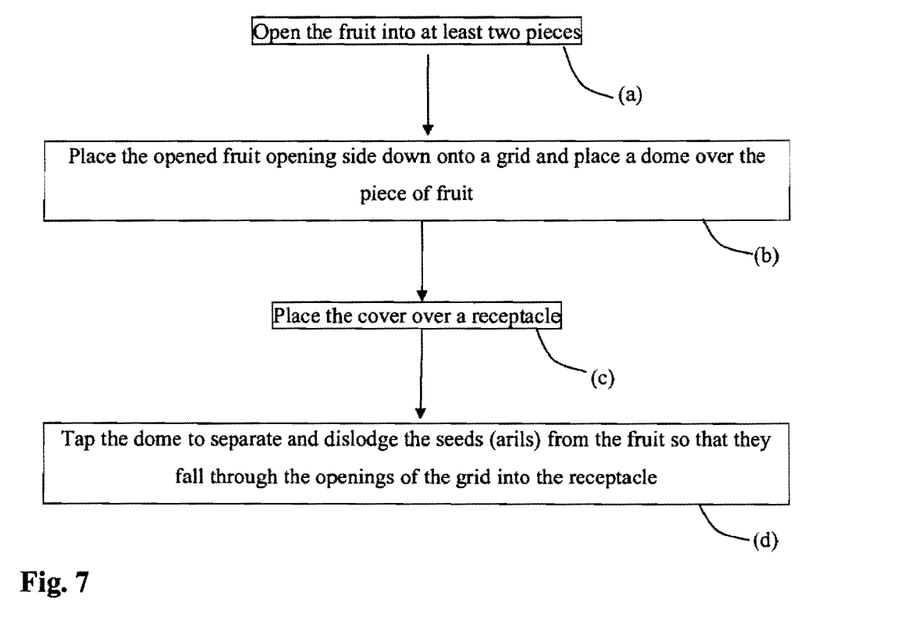
FIG. 7 is a flowchart detailing a method for removing the seeds or arils of a pomegranate or similar fruit.

As shown in FIG. 7, the present invention discloses a method for removing the seeds from a fruit or vegetable, typically a pomegranate, comprising the steps of:
(a) opening the fruit into at least two pieces;
(b) placing the opened fruit opening side down onto a perforated grid and placing a dome over the piece of fruit;
(c) placing the grid over a receptacle;
(d) tapping the dome to separate and dislodge the seeds from the fruit so that they fall through the openings into the receptacle.

It will be appreciated that the order of steps (c) and (d) may be reversed.

With appropriate variation, the method and apparatus could be used on other aril type fruit or vegetables such as akee, mangostein and jackfruit.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

We claim:

1. A method of removing arils from a pomegranate: using an apparatus comprising a grid with openings for covering a receptacle, a dome for covering a piece of the fruit, and a serving spoon; the method comprising the steps of:
(a) cutting the pomegranate into at least two pieces;
(b) placing at least one piece of the pomegranate, cut side down, onto the grid and placing the dome over the piece of the pomegranate;
(c) placing the grid over a receptacle, and
(d) tapping the dome with the serving spoon to separate and dislodge the seeds from the fruit so that they fall through the openings into the receptacle, wherein the serving spoon can also be used for dispensing arils from the receptacle.

2. The method of claim 1 wherein step (c) precedes step (b).

3. The method of claim 1 wherein each piece is substantially half a fruit.

* * * * *